United States Patent [19]

Cavitt et al.

[11] Patent Number: 4,781,984

[45] Date of Patent: Nov. 1, 1988

[54] AROMATIC POLYETHER RESINS HAVING IMPROVED ADHESION

[75] Inventors: Michael B. Cavitt, Lake Jackson; David A. Wilson, Richwood; Marvin L. Dettloff, Lake Jackson, all of Tex.

[73] Assignee: The Dow Chemical Company, Midland, Mich.

[21] Appl. No.: 43,505

[22] Filed: Apr. 28, 1987

[51] Int. Cl.$^4$ .................. B32B 15/08; B32B 27/38
[52] U.S. Cl. ...................... 428/418; 148/6.15 R; 148/6.27; 428/457; 525/523; 525/533
[58] Field of Search .................... 525/523, 533; 148/6.15 R, 6.27; 428/457, 418

[56] References Cited

U.S. PATENT DOCUMENTS

| | | | |
|---|---|---|---|
| 3,634,146 | 1/1972 | Wystrach | 148/6.15 R |
| 3,900,370 | 8/1975 | Germacheid et al. | 148/627 X |
| 4,308,079 | 12/1981 | Kenables et al. | 148/6.15 R |
| 4,362,853 | 12/1982 | Demmer | 525/533 |

*Primary Examiner*—Thomas J. Herbert

[57] ABSTRACT

Compositions containing an aromatic polyether resin and an aminophosphonic acid can be employed as coatings for untreated metallic substrates.

18 Claims, No Drawings

AROMATIC POLYETHER RESINS HAVING IMPROVED ADHESION

FIELD OF THE INVENTION

The present invention concerns aromatic polyether resins which have improved adhesion to metals and/or improved chemical resistance.

BACKGROUND OF THE INVENTION

The adhesion of coatings to various metal substrates is usually enhanced by treating the surface of the metal prior to coating the metal with coating compositions or adhesive compositions.

It would be desirable to have coating compositions which could be applied to metal substrates without their having to be treated prior to applying the coating composition.

SUMMARY OF THE INVENTION

One aspect of the present invention pertains to a composition comprising a mixture of (1) at least one aromatic polyether resin and (2) at least one aminophosphonic acid.

Another aspect of the present invention pertains to metal substrates having a coating of the aforementioned composition thereon.

The present invention provides coating compositions which can be applied to metal substrates without their having to be treated prior to applying the coating composition.

DETAILED DESCRIPTION OF THE INVENTION

The compositions of the present invention are easily prepared by simply mixing the components together. They may be mixed by any suitable mixing technique such as for example, ball milling, stirring and the like. They can be mixed in solution or dispersion in an inert solvent or dispersant at ambient or elevated temperatures or they can be blended in the absence of an inert solvent or dispersion medium at elevated temperatures, suitably at temperatures of from about 23° C. to about 200° C., more suitably at temperatures of from about 23° C. to about 150° C., most suitably at temperatures of from about 23° C. to about 100° C. The blend temperature limits depend upon the type of solvent employed. The temperature should not exceed the boiling point of the solvent. The time employed is that which is required to dissolve or disperse or blend the components.

While some aminophosphonic acids employed in the present invention are available commercially, other aminophosphonic acids can be prepared by methods disclosed in the literature such as that disclosed by K. Moedritzer and R. R. Irani in *J. Org. Chem.*, 31, 1603–1607 (1966) and that disclosed by G. Schwarzenbach, W. Biedermann and F. Bangerter in *Helv. Chim. Acta.*, 29, 811, 1946, which are incorporated herein by reference.

Suitable aminophosphonic acids which can be employed herein include, for example, those represented by the following Formulas I and II

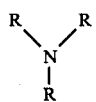  FORMULA I

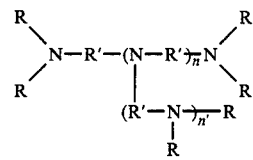  FORMULA II wherein each R is independently hydrogen or the group represented by the following Formula III

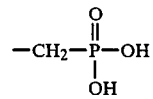  FORMULA III each R' is independently a divalent hydrogen group having from 2 to about 10 carbon atoms; n and n' independently have a value from zero to about 5; and wherein at least one of the R groups is a group represented by the Formula III.

Particularly suitable aminophosphonates include, for example, aminomethylenephosphonic acid, nitrilodi(methylenephosphonic acid), nitrilotris(methylenephosphonic acid), ethylenediaminemono(methylenephosphonic acid), ethylenediaminedi(methylenephosphonic acid), ethylenediaminetri(methylenephosphonic acid), ethylenediaminetetra(methylenephosphonic acid), propylenediaminemono(methylenephosphonic acid), propylenediaminedi(methylenephosphonic acid), propylenediaminetri(methylenephosphonic acid), propylenediaminetetra(methylphosphonic acid), hexanediaminemono(methylenephosphonic acid), hexanediaminedi(methylenephosphonic acid), hexanediaminetri(methylenephosphonic acid), hexanediaminetetra(methylenephosphonic acid), combinations thereof and the like. Also suitable are those phosphonic acid compounds based on polyalkylpolyamines such as, for example, mono(methylenephosphonic acid) of diethylenetriamine, di(methylenephosphonic acid) of diethylenetriamine, tri(methylenephosphonic acid) of diethylenetriamine, tetra(methylenephosphonic acid) of diethylenetriamine, penta(methylenephosphonic acid) of diethylenetriamine, mono(methylenephosphonic acid) of triethylenetetramine, di(methylenephosphonic acid) of triethylenetetramine, tri(methylenephosphonic acid) of triethylenetetramine, tetra(methylenephosphonic acid) of triethylenetetramine, penta(methylenephosphonic acid) of triethylenetetramine, hexa(methylenephosphonic acid) of triethylenetetramine, combinations thereof and the like.

The aminophosphonic acid that can be mixed with the aromatic polyether resins of the present invention is suitably from about 0.5 to about 20, more suitably from about 1 to about 15, more suitably from about 1 to about 10, most suitably from about 1 to about 5 parts of aminophosphonic acid compound per 100 parts by weight of aromatic polyether resin.

The aromatic polyether resins which can be employed herein include the relatively high molecular weight solid aromatic epoxy resins and the phenoxy resins. These resins have a weight average molecular weight of at least about 3,400, suitably at least about 10,000, more suitably in the range of from about 15,000 to about 60,000, most suitably in the range of from about 20,000 to about 50,000. These resins can be terminated in either a glycidyl ether group or a phenolic hydroxyl group. They are readily prepared by reacting a diglycidyl ether of a dihydric phenol with a dihydric phenol which can be the same or different from the dihydric phenol of the aforesaid diglycidyl ether in ratios which are calculated to provide the resin with the desired molecular weight. The weight average molecular weight is that obtained on standard gel permeation chromatographic instruments employing as a standard a diglycidyl ether of bisphenol A having an epoxide equivalent weight of 875 to 975.

Suitable aromatic polyether resins include, for example, those represented by the following Formulas IV and V

FORMULA IV

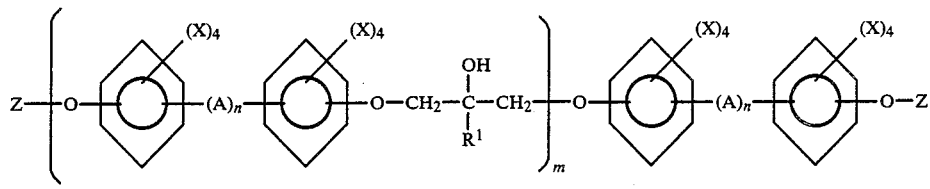

FORMULA V

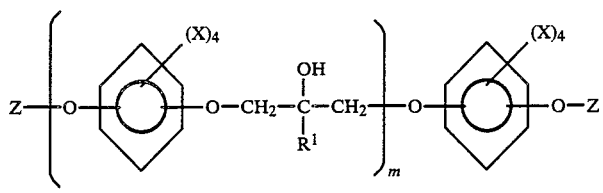

wherein each A is independently a divalent hydrocarbyl group having from 1 to about 12, suitably from 1 to about 6, more suitably from 1 to about 4, carbon atoms, —S—, —S-S—, —SO—, —SO$_2$—, —O— or —CO—; each R$^1$ is independently hydrogen or an alkyl group having from 1 to about 4 carbon atoms; each X is independently hydrogen, a monovalent hydrocarbyl or hydrocarbyloxy group having from 1 to about 12, suitably from 1 to about 6, more suitably from 1 to about 4, carbon atoms or a halogen such as chlorine, bromine or fluorine; each Z is independently hydrogen or a glycidyl group represented by the folowing Formula VI

FORMULA VI

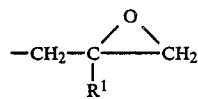

n has a value of zero or 1; and m has a value of at least about 11, suitably from about 34 to about 210, more suitably from about 52 to about 192 and most suitably from about 69 to about 175. Particularly suitable aromatic polyether resins include those prepared from a diglycidyl ether of bisphenol A and bisphenol A.

The compositions of the present invention can be dissolved in an inert solvent or dispersed in an inert diluent, if desired. Suitable inert solvents and diluents or dispersants include, for example, glycol ethers, glycol ether esters, ketones, aromatic hydrocarbons, aliphatic hydrocarbons, amides, combinations thereof and the like. Particularly suitable are, acetone, methyl ethyl ketone, methyl isobutyl ketone, ethylene glycol methyl ether, ethylene glycol ethyl ether, ethylene glycol n-butyl ether, ethylene glycol phenyl ether, diethylene glycol methyl ether, diethylene glycol ethyl ether, diethylene glycol n-butyl ether, propylene glycol methyl ether, propylene glycol ethyl ether, propylene glycol n-butyl ether, propylene glycol phenyl ether, dipropylene glycol methyl ether, dipropylene glycol ethyl ether, dipropylene glycol n-butyl ether, hexane, heptane, octane, nonane, decane, toluene, xylene, dimethylformamide, ethylene glycol methyl ether acetate, ethylene glycol ethyl ether acetate, combinations thereof and the like.

The compositions of the present invention can be mixed with curing agents which react with the aliphatic hydroxyl groups in the backbone of the aromatic polyether resins, if desired. Suitable such curing agents include, or example, urea-aldehyde resins, melamine-aldehyde resins, bisphenol-aldehyde resins, alkoxylated urea-aldehyde resins, alkoxylated melamine-aldehyde resins, alkoxylated bisphenol-aldehyde resins, polyisocyanates, blocked polyisocyanates, combinations thereof and the like. These curing agents are employed in amounts ranging from about 1 to about 40, suitably from about 1 to about 30, more suitably from about 2 to about 20 parts by weight of curing agent per 100 parts by weight of the resin being cured.

Other materials which can be mixed with the composition of the present invention include, dyes, pigments, fillers, surfactants, flow control agents, leveling agents, flame retardants, thickeners, combinations thereof and the like. Such additives are employed in functionally equivalent amounts e.g. dyes and pigments are employed in amounts which provide the resultant mixture with the desired color. Flow and leveling agents are employed in amounts which provide the resultant mixture with the desired amount of flow and leveling and so on for the other additives. However, these additives are usually employed in amounts of from about 5 to about 80, suitably from about 10 to about 70, more suitably from about 20 to about 70 parts by weight of the curing agent based upon the combined weight of the curing agent and the resin to be cured.

The compositions of the present invention are useful as coatings, paints, adhesives, laminates and the like.

The compositions of the present invention can be applied to substrates by any of the known means of application. Those which are applied in the absence of a solvent are solid and may be comminuted into powder form by any suitable means such as by grinding, and the like. The powdered formulations can then be applied to the substrates by any suitable technique such as, for example, fluidized bed coating, melting the powders and applying the melted formulation to the substrate by means of a draw bar, and the like.

The formulations can be dissolved or dispersed in inert solvents or diluents and applied to a substrate by any suitable method such as spraying, dipping, means of a draw bar, and the like.

The compositions can be applied to the substrates at any temperature from about ambient in the instance of solution or dispersed coatings to a temperature which is above the melting or flowing temperature of the coating formulation to a temperature just below the decomposition temperature of the components of the coating formulation in the instance of solvent-free or diluent-free coatings. Particularly suitable application temperatures include, for example, ambient (about 23° C.) to about 250° C., suitably from about 23° C. to about 200° C., more suitably from about 23° C. to about 150° C.

The following examples are illustrative of the invention but are not to be construed as to limiting the scope thereof.

The following compounds are employed in the examples.

AMINO A is nitrilotris(methylenephosphonic acid) dissolved in water at 50 weight percent.

AMINO B is ethylenediaminetetra(methylenephosphonic acid).

POLYETHER RESIN A is a diglycidyl ether of bisphenol A having a weight average molecular weight of 40,378.

POLYETHER RESIN B is a diglycidyl ether of bisphenol A having a weight average molecular weight of 16,000.

The following substrate materials are employed in the examples.

STEEL is unpolished, untreated cold rolled steel 24 gauge (0.63 mm) 12 in.×4 in. (304.8 mm×101.6 mm) panels.

ALUMINUM is untreated 0.025 in. (0.63 mm) thick 12 in.×4 in. (304.8 mm×101.6 mm) aluminum panels.

GALVANIZED STEEL is unpolished steel 24 gauge (0.63 mm) 12 in.×4 in. (304.8 mm×101.6 mm) panels. which are galvanized by the electrolytic method.

The following tests are employed in the examples.

CROSS-HATCH TEST: After the panels are coated and the solvent removed, the coating is cut in such a manner that 100 small blocks are made. This is accomplished by cutting horizontal lines and vertical lines measuring about 1.5×1.5 cm. Onto this cross-hatch pattern is placed acetic acid for a period of time, then wiped off and washed with water. For the STEEL panels, the contact time with the acetic acid is 2 minutes and for the ALUMINUM AND GALVANIZED STEEL panels, the contact time with acetic acid is 10 minutes. The panel is allowed to air dry for 2 minutes, then the adhesion is tested by applying tape to the cross-hatch, then removing the tape in one quick movement. The amount of uncoated blocks of coating which is removed by the tape is recorded. The lower the amount of coating removed by the tape the better the adhesion of the coating.

COATING METHOD: The panels are coated with the coating formulations using a number 28 draw down bar. The panels are prebaked at 60° C. for 0.083 hour, then placed into an oven at 200° C. for 0.5 hour after the coating formulation is applied.

EXAMPLE 1

A mixture is prepared by mixing 0.21 gm of AMINO A with 15 gms of POLYETHER RESIN A. The resulting mixture is then coated onto ALUMINUM and GALVANIZED STEEL panels employing the aforementioned coating method. The results are given in the table.

EXAMPLE 2

A mixture is prepared by mixing 0.4 gm of AMINO A with 15 gms of POLYETHER RESIN A. The resulting mixture is used to coat untreated STEEL panels employing the aforementioned coating method. The results are given in the table.

EXAMPLE 3

A mixture is prepared by mixing 0.9 gm of AMINO A with 15 gms of POLYETHER RESIN A. The resulting mixture is used to coat untreated STEEL panels employing the aforementioned coating method. The results are given in the table.

EXAMPLE 4

A mixture is prepared by mixing 0.25 gm of AMINO B with 15 gms of POLYETHER RESIN A. The resulting mixture is used to coat untreated STEEL panels employing the aforementioned coating method. The results are given in the table.

EXAMPLE 5

A mixture is prepared by mixing 0.92 gm of AMINO A with 15 gms of POLYETHER RESIN A. The resulting mixture is then coated onto ALUMINUM and GALVANIZED STEEL panels employing the aforementioned coating method. The results are given in the table.

EXAMPLE 6

A mixture is prepared by mixing 1.51 gms of AMINO A with 15 gms of POLYETHER RESIN A. The resulting mixture is then coated onto ALUMINUM and GALVANIZED STEEL panels employing the aforementioned coating method. The results are given in the table.

EXAMPLE 7

A mixture is prepared by mixing 0.27 gm of AMINO B with 15 gms of POLYETHER RESIN A. The resulting mixture is then coated onto ALUMINUM and GALVANIZED STEEL panels employing the aforementioned coating method. The results are given in the table.

EXAMPLE 8

A mixture is prepared by mixing 0.5 gm of AMINO B with 15 gms of POLYETHER RESIN A. The resulting mixture is then coated onto ALUMINUM and GALVANIZED STEEL panels employing the aforementioned coating method. The results are given in the table.

EXAMPLE 9

A mixture is prepared by mixing 0.5 gm of AMINO B with 15 gms of POLYETHER RESIN A and 3 gms of water. The resulting mixture is then coated onto GALVANIZED STEEL panels employing the aforementioned coating method. The results are given in the table.

EXAMPLE 10

A mixture is prepared by mixing 0.24 gm of AMINO A with 15 gms of POLYETHER RESIN B. The resulting mixture is then coated onto untreated STEEL panels employing the aforementioned coating method. The results are given in the table.

COMPARATIVE EXPERIMENT A

Panels are coated with the POLYETHER RESIN alone. The coated panels are baked by the same procedure as are the coatings of the examples. The results are given in the table.

| TEST NO. | EXAMPLE OR COMP. EXPT. DESIG | AMINO COMPOUND | SUB-STRATE | CROSS-HATCH TEST % of Coating Removed |
|---|---|---|---|---|
| A | A* | none | steel | 35 |
| B | 1 | Amino A | steel | 0 |
| C | 2 | Amino A | steel | 0 |
| D | 3 | Amino A | steel | 0 |
| E | 4 | Amino B | steel | 0 |
| F | A* | none | aluminum | 100 |
| G | 5 | Amino A | aluminum | 7 |
| H | 6 | Amino A | aluminum | 48 |
| I | 7 | Amino B | aluminum | 78 |
| J | 8 | Amino B | aluminum | 16 |
| K | A* | none | galvanized steel | 96 |
| L | 5 | Amino A | galvanized steel | 94 |
| M | 6 | Amino A | galvanized steel | 42 |
| N | 7 | Amino B | galvanized steel | 81 |
| O | 8 | Amino B | galvanized steel | 88 |
| P | 9 | Amino B | galvanized steel | 5 |
| Q | 10 | Amino A | untreated steel | 0 |

*Not an example of the present invention.

What is claimed is:

1. A composition comprising a mixture of (1) at least one aromatic polyether resin having a weight average molecular weight of at least about 3,400; and (2) at least one aminophosphonic acid; wherein said aminophosphonic acid is present in an amount of from about 0.5 to about 20 parts per 100 parts by weight of aromatic polyether resin.

2. A composition of claim 1 wherein said aromatic polyether resin has a weight average molecular weight of at least about 10,000 and wherein said aminophosphonic acid is present in an amount of from about 1 to about 15 parts per 100 parts by weight of aromatic polyether resin.

3. A composition of claim 2 wherein said aromatic polyether resin has a weight average molecular weight of from about 15,000 to about 60,000 and wherein said aminophosphonic acid is present in an amount of from about 1 to about 10 parts per 100 parts by weight of aromatic polyether resin.

4. A composition of claim 3 wherein said aromatic polyether resin has a weight average molecular weight of from about 20,000 to about 50,000 and wherein said aminophosphonic acid is present in an amount of from about 1 to about 5 parts per 100 parts by weight of aromatic polyether resin.

5. A composition of claim 1 wherein said aromatic polyether resin is represented by the following Formulas IV and V

FORMULA IV

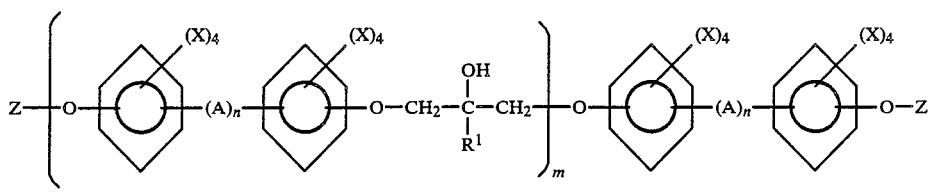

FORMULA V

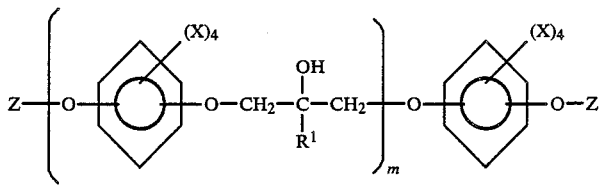

wherein each A is independently a divalent hydrocarbyl group having from 1 to about 12, suitably from 1 to about 6, more suitably from 1 to about 4 carbon atoms, —S—, —S-S—, —SO—, —SO$_2$—, —O— or —CO—; each R$^1$ is independently hydrogen or an alkyl group having from 1 to about 4 carbon atoms; each X is independently hydrogen, a monovalent hydrocarbyl or hydrocarbyloxy group having from 1 to about 12 carbon atoms or a halogen; each Z is independently hydrogen or a glycidyl group represented by following Formula VI

FORMULA VI

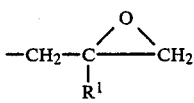

n has a value of zero or 1 and m has a value of at least about 11; and said aminophosphonic acid is represented by the following Formulas I and II

FORMULA I

-continued

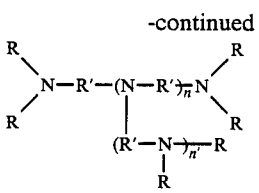
FORMULA II wherein each R is independently hydrogen or the group represented by the following formula III

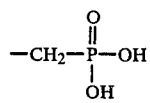
FORMULA III each R' is independently a divalent hydrocarbon group having from 2 to about 10 carbon atoms; and wherein at least one of the R groups is a group represented by the Formula III; and n and n' independently have a value of from zero to about 5.

6. A composition of claim 5 wherein
   (a) said aromatic polyether resin is represented by formula IV wherein each A is independently a divalent hydrocarbyl group having from 1 to about 6 carbon atoms, —S—, —S-S—, —SO—, —SO$_2$—, —O— or —CO—; each R$^1$ is independently hydrogen or an alkyl group having from 1 to about 4 carbon atoms; each X is independently hydrogen, a monovalent hydrocarbyl or hydrocarbyloxy group having from 1 to about 6 carbon atoms or a halogen; n has a value of 1 and m has a value of from about 34 to about 210;
   (b) said amino phosphonic acid is represented by Formulas I, or II wherein each R is independently hydrogen or the group represented by Formula III; each R' is independently a divalent hydrocarbon group having from 2 to about 10 carbon atoms; n and n' independently have a value from zero to about 5; and wherein at least one of the R groups is a group represented by Formula III; and
   (c) said aminophosphonic acid is present in an amount of from about 1 to about 15 parts per 100 parts by weight of said aromatic polyether resin.

7. A composition of claim 6 wherein
   (a) in said aromatic polyether resin A is independently a divalent hydrocarbyl group having from 1 to about 4 carbon atoms; each R$^1$ is hydrogen; each X is independently hydrogen, a monovalent hydrocarbyl or hydrocarbyloxy group having from 1 to about 4 carbon atoms or a halogen; and m has a value of from about 52 to about 192; and
   (b) said aminophosphonic acid is present in an amount of from about 1 to about 10 parts per 100 parts by weight of said aromatic polyether resin.

8. A composition of claim 7 wherein
   (a) in said aromatic polyether resin m has a value of from about 69 to about 175; and
   (b) said aminophosphonic acid is present in an amount of from about 1 to about 5 parts per 100 parts by weight of said aromatic polyether resin.

9. A composition of claim 8 wherein
   (a) in said aromatic polyether resin, A is an isopropylidene group and each X is hydrogen; and
   (b) said aminophosphonic acid is nitrilotris(methylenephosphonic acid), ethylenediaminetetra(methylenephosphonic acid), or a combination thereof.

10. A steel, galvanized steel or aluminum substrate coated with a composition of claim 1.
11. A steel, galvanized steel or aluminum substrate coated with a composition of claim 2.
12. A steel, galvanized steel or aluminum substrate coated with a composition of claim 3.
13. A steel, galvanized steel or aluminum substrate coated with a composition of claim 4.
14. A steel, galvanized steel or aluminum substrate coated with a composition of claim 5.
15. A steel, galvanized steel or aluminum substrate coated with a composition of claim 6.
16. A steel, galvanized steel or aluminum substrate coated with a composition of claim 7.
17. A steel, galvanized steel or aluminum substrate coated with a composition of claim 8.
18. A steel, galvanized steel or aluminum substrate coated with a composition of claim 9.

* * * * *